Sept. 4, 1945.   A. H. C. BISHOP   2,384,233
MAGNIFYING GLASS HOLDER
Filed Nov. 4, 1943
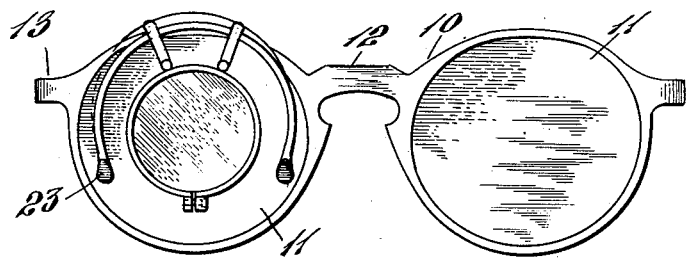
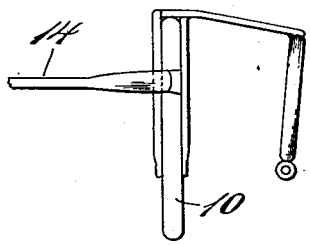
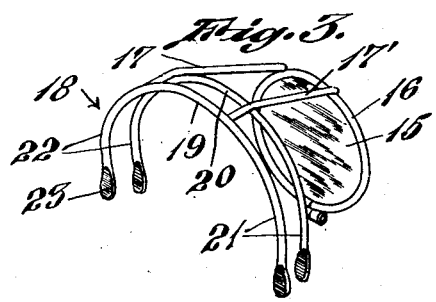
INVENTOR
Alfred H. C. Bishop
BY Barlow & Barlow
ATTORNEYS Patented Sept. 4, 1945

2,384,233

UNITED STATES PATENT OFFICE 2,384,233

MAGNIFYING GLASS HOLDER

Alfred H. C. Bishop, Cranston, R. I.

Application November 4, 1943, Serial No. 508,919

2 Claims. (Cl. 88—41)

This invention relates to a holder for a magnifying glass and has particular reference to a means for mounting a glass upon a spectacle so as to avoid the possibility of scratching or otherwise marring the lens of the spectacle upon which it is mounted.

Devices of this sort are sometimes referred to as a watchmaker's loops and usually consist of a lens in a rim with a post extending rearward having two rings at a spaced distance for mounting upon the spectacle lens. Upon mounting the two rings upon the spectacle lens the rings will rub across the lens substantially the full area thereof and are liable to mar or abrade the lens. At times some protective means are provided upon such rings but when these protective loops accumulate dirt the dirt acts as an abrasive and will mar or scratch the glass.

One of the objects of this invention is to provide an arrangement to eliminate the possibility of marring or scratching the glass of the spectacle lens upon which the device is mounted.

Another object of the invention is to arrange the engaging parts so that they will not be passed over the portion of the spectacle lens through which vision is ordinarily had. Another object of the invention is to so shape the ends of the parts which mount the device that they may be easily moved into position across the lens.

With these and other objects in view, the invention consists of certain novel features of construction, as will be more fully described and particularly pointed out in the appended claims.

In the accompanying drawing:

Fig. 1 is a face view of a spectacle showing my device as mounted in position with reference to one of the lenses of the spectacles;

Fig. 2 is a side elevation thereof;

Fig. 3 is a perspective view of the device alone;

Fig. 4 is an edge view on an enlarged scale showing the end portion of one of the arms which provide for mounting the device in position on the spectacles.

In proceeding with this invention I so arrange the means which engage the spectacle lens that when positioned over the spectacle lens the parts will not move over the portion of the lens through which vision is primarily had but rather to either side thereof.

With reference to the drawing 10 designates a spectacle frame in which lenses 11 are mounted. A bridge 12 connects the two rims while temple end pieces 13 extend from either of the rims for mounting of temples 14 which hold the spectacles in position.

The magnifying glass which I provide is designated 15 and is mounted in a rim 16, from this rim post means consisting of two rods 17 and 17' are provided, which post means support a mounting means designated generally 18 to engage the spectacle. This mounting means consists of a pair of U-shape wire arms 19 and 20 which are mounted at their mid-point to the post means 17, 17' so that one portion thereof 21 extends on one side of this post means while another portion 22 extends on the other side of the post means. The arrangement is such that the parts 21 and 22 of each arm are generally parallel and are in substantially balanced relation. These U-shaped arms 19 and 20 are spaced a distance from the rim 16 so as to give the proper focus to the lens 15. The arms 19 and 20 are spaced from each other a relatively shorter distance so as to be accommodated over one of the rims of the spectacle frame 10. Each of the arms 19 and 20 at their ends are flattened as at 23 so as to provide an oval shape which will enable these arms to be more easily slid into position over the spectacle rim and lens therein.

It will be noted that each of the arms at their ends 23 are spaced apart so as to form an open U whereby any part of these arms 19 and 20 will not move across the main portion of vision of the lenses 11 of the spectacle frame on which they are mounted but rather will move over and engage only the extreme side edges thereof. Thus no scratching can occur of this lens 11 by its mounting in position.

I claim:

1. A device of the class described comprising a rim, a lens therein, post means extending from said rim, a pair of mounting arms carried in spaced relation by said post means at a point a substantial distance from said rim, said arms being generally U-shape with the end portions generally parallel and with the mid portion attached to said post means, said parallel portions of each arm terminating in ends free from the other arm which extend a distance substantially below the center of said lens with respect to the point of attachment of said post means to said arms, both of said arms being resilient from the post means to their free ends for movement toward and from each other for receiving a lens between them.

2. A device of the class described comprising a rim, a lens therein, post means extending from said rim, a pair of mounting arms carried in spaced relation by said post means at a point a substantial distance from said rim, each of said arms being generally U-shape with the end portions generally parallel and with the mid portion attached to said post means, said parallel portions terminating in free ends which are flattened to lie in a plane generally parallel to the lens and which extend a distance substantially below the center of said lens with respect to the point of attachment of said post means to said arms, both of said arms being resilient from the post means to their free ends for movement toward and from each other.

ALFRED H. C. BISHOP.